(12) United States Patent
Wu

(10) Patent No.: US 11,359,571 B2
(45) Date of Patent: Jun. 14, 2022

(54) DEVICE AND METHOD FOR INHIBITING UNINTENDED VEHICLE ACCELERATION

(71) Applicant: Wen-Yi Wu, New Taipei (TW)

(72) Inventor: Wen-Yi Wu, New Taipei (TW)

( * ) Notice: Subject to any disclaimer, the term of this patent is extended or adjusted under 35 U.S.C. 154(b) by 0 days.

(21) Appl. No.: 17/213,194

(22) Filed: Mar. 25, 2021

(65) Prior Publication Data

US 2021/0215115 A1    Jul. 15, 2021

Related U.S. Application Data

(63) Continuation-in-part of application No. 16/705,167, filed on Dec. 5, 2019.

(51) Int. Cl.
| | |
|---|---|
| *F02D 41/22* | (2006.01) |
| *F02D 17/04* | (2006.01) |
| *F02D 41/10* | (2006.01) |
| *F02D 41/16* | (2006.01) |
| *F02D 41/04* | (2006.01) |

(52) U.S. Cl.
CPC ............. *F02D 41/22* (2013.01); *F02D 17/04* (2013.01); *F02D 41/045* (2013.01); *F02D 41/10* (2013.01); *F02D 41/16* (2013.01); *F02D 2200/602* (2013.01)

(58) Field of Classification Search
CPC .................. F02D 41/123; F02D 2200/602
See application file for complete search history.

(56) References Cited

U.S. PATENT DOCUMENTS

| | | | | |
|---|---|---|---|---|
| 2,825,418 A | * | 3/1958 | Kershman | B60Q 1/441 180/313 |
| 3,926,275 A | * | 12/1975 | Nersesian | B60K 26/021 180/313 |
| 5,155,682 A | * | 10/1992 | Ninoyu | B60K 31/047 701/53 |

(Continued)

FOREIGN PATENT DOCUMENTS

| | | | |
|---|---|---|---|
| CN | 202345406 U | * | 7/2012 |
| CN | 106184219 A | * | 12/2016 |

(Continued)

*Primary Examiner* — Joseph J Dallo
(74) *Attorney, Agent, or Firm* — Birch, Stewart, Kolasch & Birch, LLP

(57) ABSTRACT

The inhibition device includes a micro-controller configured with a triggering condition including a number of intervals and, for each interval, a corresponding duration and a corresponding threshold. Each interval is a range specifying how much the vehicle's acceleration pedal has changed its position in terms of percentages of a pedal stroke. Each duration specifies the fastest time duration allowable for the acceleration pedal to attain a corresponding interval of pedal position change. The micro-controller converts progress signals of the acceleration pedal to corresponding percentages, obtains a difference DEF between the successive percentages, records a time duration RES between successive progress signals, and calculates DEF/RES=X. When X is greater than or equal to a threshold of a corresponding interval, the micro-controller sends an idle signal to the vehicle's engine control unit or intercepts the progress signals to prevent them from reaching the engine control unit.

2 Claims, 4 Drawing Sheets

(56) References Cited

U.S. PATENT DOCUMENTS

| | | | | |
|---|---|---|---|---|
| 5,553,581 A | * | 9/1996 | Hirabayashi | F02D 11/107 123/399 |
| 5,902,211 A | * | 5/1999 | Jones | F16D 48/08 477/125 |
| 6,647,957 B1 | * | 11/2003 | Cha | F02D 33/006 123/359 |
| 7,183,729 B2 | * | 2/2007 | De Waele | B60L 58/34 318/139 |
| 7,395,887 B2 | * | 7/2008 | Viergever | B60W 10/06 180/65.265 |
| 8,122,843 B2 | * | 2/2012 | Lindsay | B60Q 9/00 116/139 |
| 9,546,629 B2 | * | 1/2017 | Morinaga | F02D 41/401 |
| 9,849,780 B2 | * | 12/2017 | Kim | G05G 5/005 |
| 10,555,076 B1 | * | 2/2020 | Valeri | G07C 5/0833 |
| 2004/0108161 A1 | | 6/2004 | Ohno | B60W 30/18181 180/315 |
| 2005/0015196 A1 | * | 1/2005 | Hawkins | F02D 31/009 701/110 |
| 2010/0134263 A1 | * | 6/2010 | Mathony | G08G 1/161 340/435 |
| 2011/0279255 A1 | * | 11/2011 | Miyoshi | G01C 21/3469 340/441 |
| 2013/0196816 A1 | * | 8/2013 | Natsume | B60W 20/00 477/3 |
| 2016/0010735 A1 | * | 1/2016 | Ohashi | F16H 45/02 192/3.32 |
| 2016/0368444 A1 | * | 12/2016 | Kim | E05F 15/73 |
| 2017/0008526 A1 | * | 1/2017 | Ko | B60K 28/14 |
| 2018/0179982 A1 | * | 6/2018 | Botti | F02M 63/0015 |

FOREIGN PATENT DOCUMENTS

| | | | |
|---|---|---|---|
| CN | 107878198 A | * | 4/2018 |
| KR | 20160093441 A | * | 8/2016 |

* cited by examiner

DEVICE AND METHOD FOR INHIBITING UNINTENDED VEHICLE ACCELERATION

CROSS-REFERENCE TO RELATED APPLICATION

This is a continuation-in-part of co-pending U.S. patent application Ser. No. 16/705,167 filed on Dec. 5, 2019.

TECHNICAL FIELD OF THE INVENTION

The present invention is generally related to vehicle driving safety, and more particular to an inhibition device and a related method against a driver's accidental pressing the accelerator pedal.

DESCRIPTION OF THE PRIOR ART

Unintended vehicle acceleration usually occurs when a vehicle is an idle and ready-to-run state. It is a condition unexpected by the vehicle driver and often leading to traffic incidents.

Most unintended vehicle acceleration is caused by improper operation from the driver. An ordinary vehicle has its acceleration pedal and brake pedal next to each other. A driver therefore may accidentally step on the acceleration pedal while he/she actually intends to brake, especially when the driver is careless or nervous.

SUMMARY OF THE INVENTION

The present invention therefore teaches an inhibition device and a related method for preventing unintended vehicle acceleration. The inhibition device includes a micro-controller configured with a triggering condition and a releasing condition. The triggering condition includes a number of intervals and, for each interval, a corresponding duration and a corresponding threshold. Each interval is a percentage range specifying how much the vehicle's acceleration pedal has changed its position in terms of percentages of a pedal stroke. Each duration specifies the fastest time duration allowable for the acceleration pedal to attain a corresponding interval of acceleration pedal position change. The micro-controller converts progress signals of the acceleration pedal to corresponding percentages of the pedal stroke, obtains at least a difference DEF between the successive percentages, records at least a time duration RES between successive progress signals, and calculates DEF/RES=X. When X is greater than or equal to a threshold corresponding to an interval to which the DEF belongs to, the micro-controller sends an idle signal to the vehicle's engine control unit or intercepts the progress signals to prevent them from reaching the engine control unit, so that the vehicle restores to an idle state. The releasing condition is when the progress signals of the acceleration pedal are reduced to at least 10% of the pedal stroke, where the micro-controller stops the idle signal.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
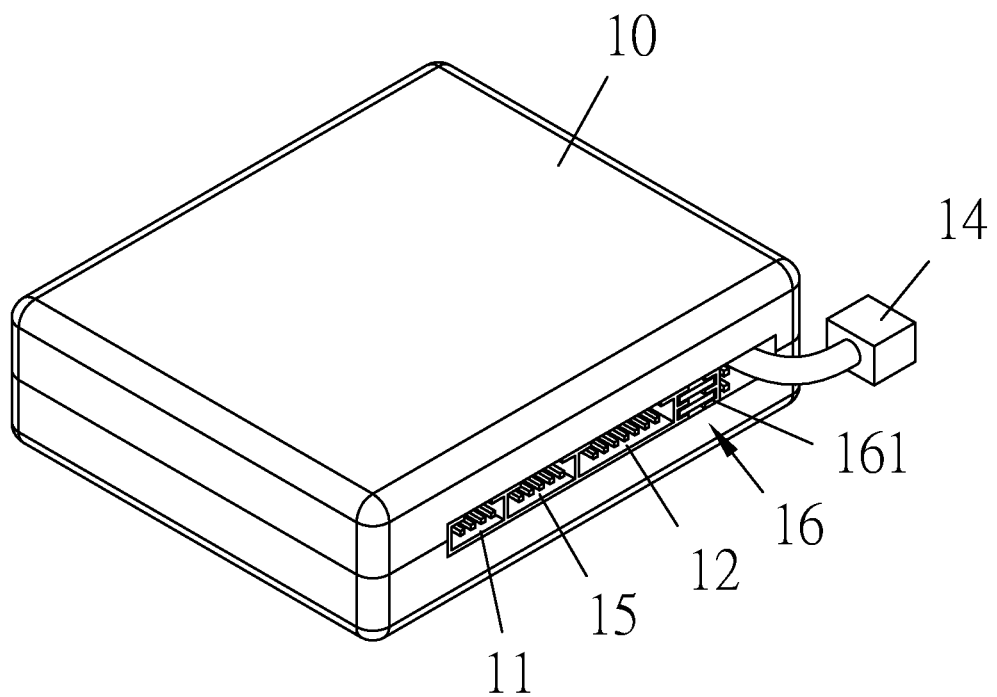
FIG. 1 is a perspective diagram showing an inhibition device according an embodiment of the present invention.
Figure 2:
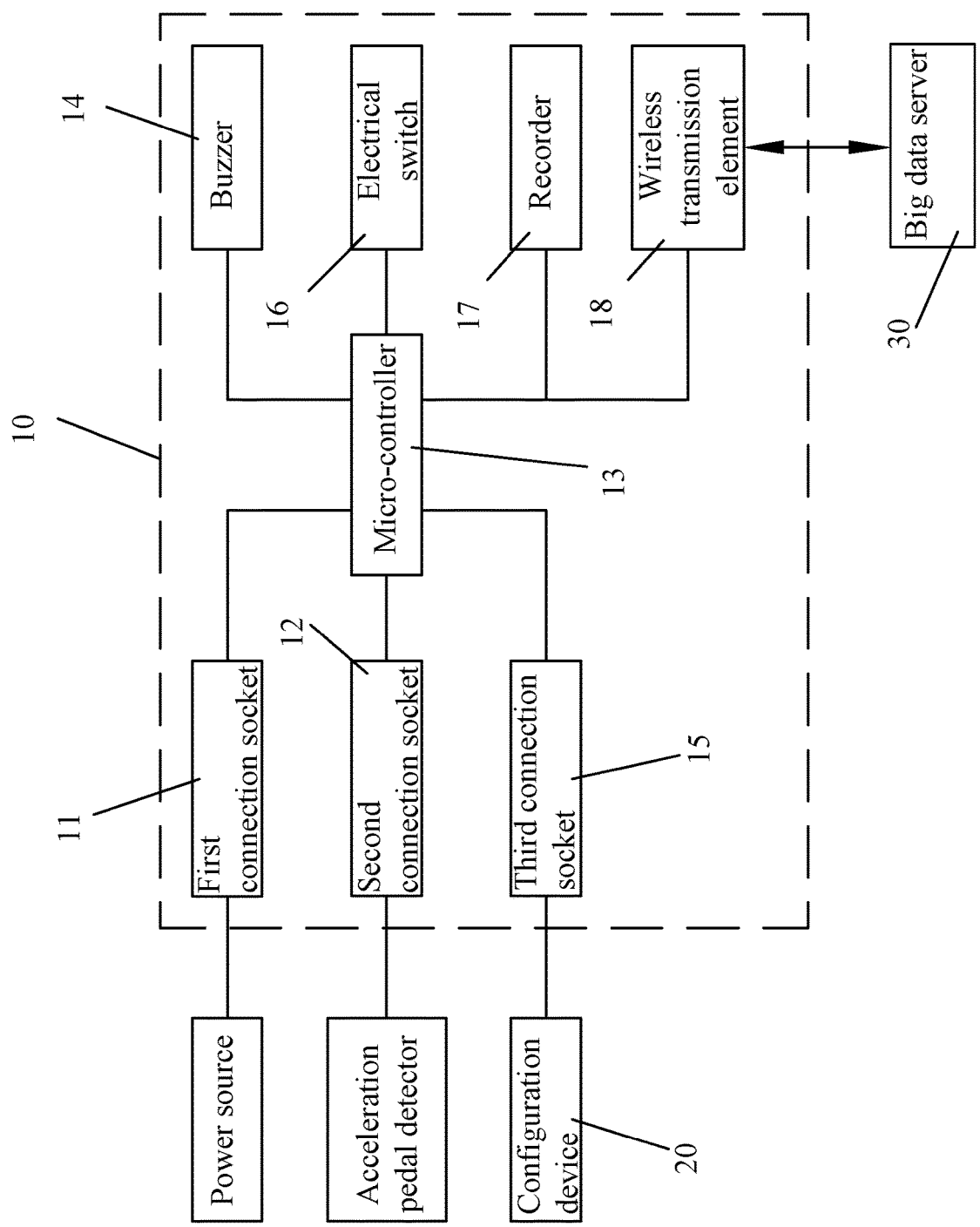
FIG. 2 is a functional block diagram showing the inhibition device of FIG. 1.

As shown in FIGS. 1 and 2, an inhibition device according to an embodiment of the present invention includes the following components.

The inhibition device is mainly embodied in a main member 10, which includes a first connection socket 11, a second connection socket 12, a micro-controller or micro control unit (MCU) 13, a buzzer 14, a third connection socket 15, an electrical switch 16, and a recorder 17. The first connection socket 11 is electrically connected to a power source of a vehicle where the inhibition device is installed. The power source of the vehicle includes at least a fuse. The main member 10 may have an aluminum casing, or a plastic casing internally attached with a copper plate, both capable of for shielding electromagnetic waves.

The second connection socket 12 is electrically connected to an acceleration pedal detector of the vehicle and, when the acceleration pedal is engaged and disengaged, a number of progress signals is delivered to the micro-controller 13, in addition to the vehicle's engine control unit (ECU).

The micro-controller 13 is configured with a triggering condition and a releasing condition. The triggering condition is defined by a number of intervals and, for each interval, a corresponding duration. The intervals are a number of ranges reflecting how much acceleration pedal has changed its position in terms of percentages of the pedal's complete stroke from fully release to flooring. In the present embodiment, the intervals defined are 0~30%, 30~60%, and 60~100%, but the present invention is not limited as such.

The 0~30%, 30~60%, and 60~100% intervals mean the pedal position has changed between successive progress signals for an amount that is within 0~30%, 30~60%, and 60~100% of the pedal's complete stroke, reflecting when the acceleration pedal is pressed for a short distance, for a longer distance, or until the acceleration pedal is floored.

Each duration specifies the fastest time duration allowable for a driver to press the acceleration pedal to attain the corresponding interval of pedal position change. In the present embodiment, each duration has a range between 1 and 2000 ms but the present invention is not limited as such.

Figure 3:
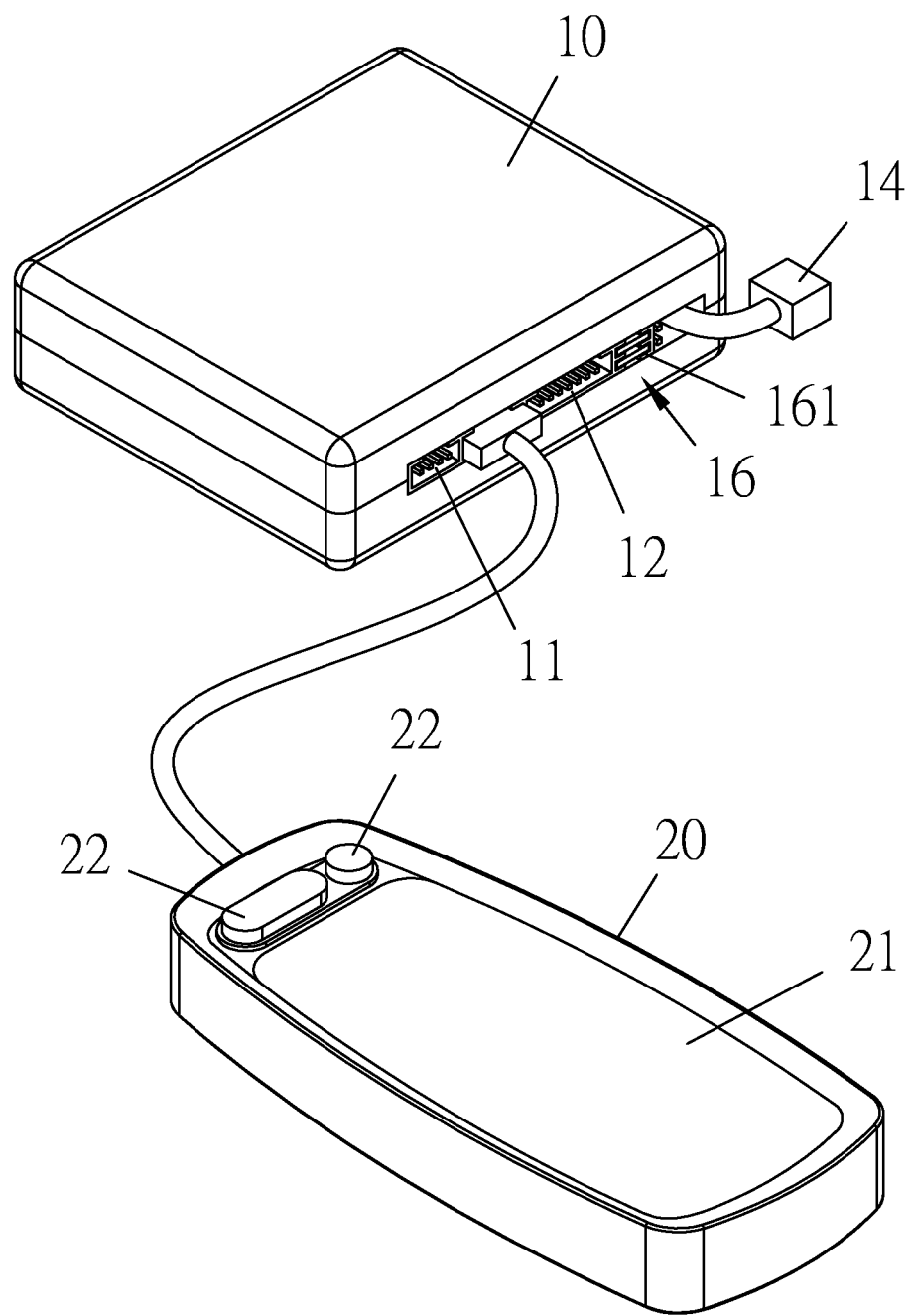
FIG. 3 is a perspective diagram showing the connection of the inhibition device of FIG. 1 to a configuration device.

As shown in FIGS. 2 and 3, the third connection socket 15 is electrically connected to a configuration device 20, which includes a display 21 and a number of control buttons 22 for setting the acceleration pedal interval parameters and the response time parameter.

The electrical switch 16 includes a number of pins and at least a jumper 161 to close, open or bypass some of the pins so as to configure an operation mode of the engine control unit.

The recorder 17 records various data from the vehicle such as the operation statuses of the vehicle's acceleration pedal, brake system. The recording made by the recorder 17 allows examination after an accident occurs so as to and investigate the causes of the accident.

During when the acceleration pedal is pressed, a number of progress signals are produced according to how much the acceleration pedal is pressed, and the progress signals are transmitted to the vehicle's engine control unit (ECU). The engine control unit, accordingly, adjusts the throttle and fuel injector so that gas and air are mixed appropriately and optimal power is delivered by the engine. Therefore, despite that acceleration pedal is accidentally pressed, the engine control unit would still faithfully respond and the engine deliver as usual the corresponding power, causing traffic accident.

The triggering condition of the present invention is therefore equal to each interval divided by its corresponding duration as a threshold. If the progress signals of the acceleration pedal reflect that the pedal's position change falls within a specific interval within an even shorter duration (thereby, exceeding the corresponding threshold), the micro-controller 13 sends an idle signal to the engine control unit (ECU) or the micro-controller 13 intercepts the progress signals so that they do not reach the engine control unit. The vehicle's engine then restores to the idle state. The buzzer 14 is also activated to sound an audible alarm. The unintended acceleration is as such avoided.

The present invention also teaches a related method as follows. Firstly, the micro-controller 13 continuously receives a number of progress signals of the acceleration pedal. The micro-controller 13 converts the progress signals to corresponding percentages of the pedal stroke, and obtains at least a difference DEF between the successive percentages. The micro-controller 13 also records at least a time duration RES between the successive progress signals. The micro-controller 13 then calculates DEF/RES=X. When X is greater than or equal to a threshold corresponding to an interval to which the DEF belongs to, the micro-controller 13 sends an idle signal to the engine control unit or the micro-controller intercepts the progress signals to prevent them from reaching the engine control unit, so that the engine of the vehicle restores to the idle state. In the meantime, the buzzer 14 is activated to issue an audible alarm. When the progress signals of the acceleration pedal are reduced to at least 10% of the pedal stroke, the micro-controller 13 stops the idle signal (i.e., the releasing condition).

In other words, the micro-controller 13 continuously monitors the acceleration pedal positions and the times when these positions are reached. The micro-controller 13 then obtains (1) DEF from two successive progress signals, and (2) RES from two successive progress signals. Then, when DEF/RES is greater than or equal to the triggering condition (i.e., the threshold determined by which interval DEF belongs to), the micro-controller 13 sends an idle signal or the micro-controller 13 intercepts the progress signals so that they do not reach the engine control unit (ECU). In either case, the throttle of the vehicle's engine is closed. The vehicle restores to the idle state. The accidental pressing of the acceleration pedal then will not lead to unintended acceleration.

When the progress signals of the acceleration pedal are reduced to at least 10% of the pedal stroke, the micro-controller 13 stops the idle signal so that the acceleration pedal is restored to function normally.

The micro-controller 13 may further include a wireless transmission element 18 connecting to a big data server 30 for data storage and update.

When the inhibition device fails to function correctly, a user may conduct the following resolution.

1. The user may first check whether all connections are proper and secured. If all connections are normal, the user may check whether the fuse is still operational or replace it with a new one. Usually the inhibition device may be restored in this way after restarting the vehicle.

Figure 4:
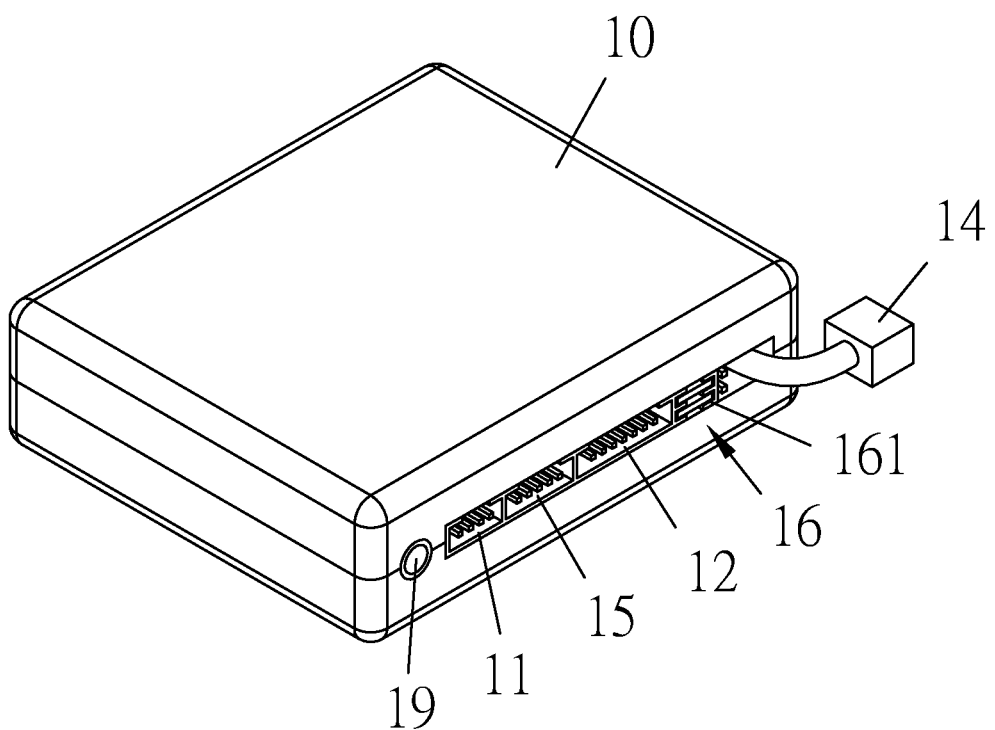
FIG. 4 is a perspective diagram showing an inhibition device according another embodiment of the present invention.

2. As shown in FIG. 4, the main member 10 further include a switch 19. If the inhibition device still cannot be restored after the above procedure, the inhibition device may be turned off (and on) using the switch 19.

3. The user may turn off the vehicle and then turn the ignition (not starting the engine but only turning on the electricity), press the acceleration pedal slowly until it is floored, and hold the pedal for about 2 to 3 minutes. The vehicle will sound one long beep and one short beep, indicating that the inhibition device is turned off.

4. The user then again then turn the ignition (not starting the engine but only turning on the electricity) to restart the inhibition device. The inhibition device will then be back online with default parameters.

To further enhance driving safety, the inhibition device may further include a blind-spot detection system activated after the vehicle is started. The blind-spot detection system employs a 24 GHz mm-wave radar to provide detection and alert (1) when there is an object adjacent a lateral side of the vehicle, (2) when the vehicle changes lanes, (3) when there is an object adjacent to the rear of the vehicle, and (4) when a vehicle door is opened.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An inhibition device for preventing unintended acceleration of a vehicle, where the vehicle comprises a power source, an acceleration pedal that is movable in a complete stroke from a fully released state to a flooring state, an acceleration pedal detector, and an engine control unit, the inhibition device comprising a main member, wherein:

the main member comprises a switch, a first connection socket, a second connection socket, a third connection socket, a recorder, a micro-controller, a buzzer, an electrical switch, and a blind-spot detection system, wherein the switch is operable for turning on and off operation of the main body;

the first connection socket is electrically connected to the power source;

the second connection socket is electrically connected to the acceleration pedal detector;

the micro-controller receives a plurality of progress signals from the acceleration pedal detector via the second connection socket;

the micro-controller comprises a wireless transmission element connecting to a big data server and the micro-controller is configured with a triggering condition and a releasing condition;

the triggering condition comprises a plurality of intervals and, for each interval, a corresponding duration and a corresponding threshold equal to the corresponding interval divided by the corresponding duration, wherein the intervals are positional ranges of the complete stroke of the acceleration pedal from the fully released state to the flooring state of the acceleration pedal, the positional ranges being defined as 0-30%, 30-60%, and 60-100% of the complete stroke, and each duration is between 1-2,000 ms;

each interval is a percentage range specifying how much the acceleration pedal has changed its position in terms of percentages of a pedal stroke converted from successive progress signals;

each duration specifies the fastest time duration allowable for the acceleration pedal to attain a corresponding interval of acceleration pedal position change;

the third connection socket is arranged for electrically connecting to a configuration device, and the configuration device comprises a display and a plurality of control buttons for setting the intervals and durations;

the recorder is operable to record operation statuses of the vehicle's acceleration pedal and brake system;

the electrical switch comprises a plurality of pins and at least a jumper to close, open or bypass some of the pins so as to configure an operation mode of the engine control unit;

the blind-spot detection system is activated after the vehicle is started and is operable to employ a 24 GHz mm-wave radar to provide detection and alter of an object approaching a lateral side of the vehicle, changing of lanes, an object approaching a rear of the vehicle, and opening of a vehicle door;

the micro-controller converts the progress signals to corresponding percentages of the pedal stroke, obtains at least a difference DEF between the successive percentages, records at least a time duration RES between successive progress signals, calculates DEF/RES=X;

when X is greater than or equal to a threshold corresponding to an interval to which the DEF belongs to, the micro-controller activates the buzzer to issue an audible alarm, sends an idle signal to the engine control unit or intercepts the progress signals to prevent them from reaching the engine control unit, so that a throttle of an engine of the vehicle is closed and the vehicle restores to an idle state; and the releasing condition is when the progress signals of the acceleration pedal are reduced to at least 10% of the pedal stroke, where the micro-controller stops the idle signal and the intervals and the durations are updated by means of transmission made through a big data server, wherein the acceleration pedal detector is operable to detect positions of the acceleration pedal in the complete stroke from the fully released state to the flooring state to generate and transmit the progress signals to the micro-controller so that the calculation of X is performed separately for each specific one of the intervals.

2. An inhibition method for preventing unintended acceleration of a vehicle, where the vehicle comprises a power source, an acceleration pedal that is movable in a complete stroke from a fully released state to a flooring state, an acceleration pedal detector, and an engine control unit, the inhibition method comprising:

receiving a plurality of progress signals of the acceleration pedal by a micro-controller from the acceleration pedal detector;

converting the progress signals to corresponding percentages of a complete stroke of the acceleration pedal of the vehicle and obtaining at least a difference DEF between successive percentages by the micro-controller;

recording at least a time duration RES between successive progress signals and calculating DEF/RES=X;

when X is greater than or equal to a threshold corresponding to an interval to which the DEF belongs to, activating a buzzer to issue an audible alarm, sending an idle signal to the engine control unit or intercepting the progress signals to prevent them from reaching the engine control unit, so that the vehicle restores to an idle state; and when the progress signals of the acceleration pedal are reduced to at least 10% of the pedal stroke, stopping the idle signal by the micro-controller;

wherein the acceleration pedal detector is operable to detect positions of the acceleration pedal in the complete stroke from the fully released state to the flooring state to generate and transmit the progress signals to the micro-controller so that the calculation of X is performed separately for each specific one of the intervals.

\* \* \* \* \*